(12) United States Patent  
Bluestein et al.

(10) Patent No.: US 10,114,439 B2  
(45) Date of Patent: Oct. 30, 2018

(54) ACHIEVING A CONSISTENT COMPUTING DEVICE BATTERY DRAIN RATE

(71) Applicant: Microsoft Technology Licensing, LLC, Redmond, WA (US)

(72) Inventors: Eric Bluestein, Seattle, WA (US); Graham Wong, Kirkland, WA (US); Mehmet Iyigun, Kirkland, WA (US); Hari R. Pulapaka, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 15/165,431

(22) Filed: May 26, 2016

(65) Prior Publication Data

US 2017/0344092 A1    Nov. 30, 2017

(51) Int. Cl.  
*G06F 1/32*    (2006.01)

(52) U.S. Cl.  
CPC ............ *G06F 1/3212* (2013.01); *G06F 1/329* (2013.01)

(58) Field of Classification Search  
CPC .................................................. G06F 1/3212  
See application file for complete search history.

(56) References Cited

U.S. PATENT DOCUMENTS

| | | |
|---|---|---|
| 8,433,931 B2 | 4/2013 | Burg et al. |
| 8,677,168 B2 | 3/2014 | Pocklington et al. |
| 8,843,774 B2 | 9/2014 | Chen et al. |
| 2004/0098222 A1* | 5/2004 | Pehrsson ............ G01R 31/3648 702/176 |
| 2008/0165714 A1 | 7/2008 | Dettinger et al. |
| 2010/0145643 A1 | 6/2010 | Katpelly et al. |
| 2012/0239949 A1 | 9/2012 | Kalyanasundaram et al. |
| 2012/0290865 A1* | 11/2012 | Kansal ................. G06F 1/3203 713/340 |
| 2014/0173319 A1 | 6/2014 | Zeng |

(Continued)

OTHER PUBLICATIONS

Nelson, et al., "Composable Power Management with Energy and Power Budgets per Application", In Proceedings of International Conference on Embedded Computer Systems, Jul. 18, 2011, 8 pages.

(Continued)

*Primary Examiner* — Kim Huynh  
*Assistant Examiner* — Eric Chang  
(74) *Attorney, Agent, or Firm* — Workman Nydegger

(57) ABSTRACT

Achieving a consistent battery drain rate at a computing device includes identifying an amount of available battery energy, and identifying a target device runtime using the available energy. A plurality of time periods over which to budget energy use to achieve the target device runtime are identified, and an allotment of the available energy for each of the plurality of time periods is determined. A determination of how to allocate the allotted energy for a current time period is made. The determination includes identifying a priority of each application based user-facing attributes of each application, identifying an energy budget for each application, and allocating a portion of the allotted energy for the current time period to each application based on their identified priority and their energy budget. The energy budget for at least one application is adjusted based on that applications' energy usage during the current time period.

20 Claims, 3 Drawing Sheets

(56) References Cited

U.S. PATENT DOCUMENTS

2014/0365789 A1  12/2014  Seo et al.
2014/0366042 A1  12/2014  Chan et al.
2015/0301582 A1  10/2015  Pan
2016/0070326 A1  3/2016  Hsiao et al.

OTHER PUBLICATIONS

Roy, et al., "Energy Management in Mobile Devices with the Cinder Operating System", In Proceedings of the sixth conference on Computer systems, Apr. 10, 2011, pp. 1-15.
Nijnatten, D. Van., "Budgeting energy in a composable microkernel", In Master's thesis of Eindhoven University of Technology, Sep. 2013, 67 pages.

* cited by examiner

ACHIEVING A CONSISTENT COMPUTING DEVICE BATTERY DRAIN RATE

BACKGROUND

Computer systems and related technology affect many aspects of society. Indeed, the computer system's ability to process information has transformed the way we live and work. While computer systems traditionally operated directly on energy supplied by the power grid (e.g., desktop computers), recent years have brought about the proliferation of mobile computing devices (e.g., laptops, smartphones, tablets) that operate primarily on energy stored in batteries. While the development of many hardware components of mobile computing devices (e.g., processing, storage, memory, and displays) has been rapid, energy storage (e.g., battery) technology—including battery energy density—has largely remained unchanged. As such, while energy demands by the hardware components of mobile computing devices, and use of mobile computing device, have increased, available energy capacity has largely remained constant.

The rate of usage of energy by hardware components of a mobile computing device is largely dependent on the software that is executing on the mobile computing device. Thus, while operating on battery power, mobile computing devices have a fixed amount of energy that can be used by all applications and the operating system before the battery is exhausted. Some applications tend to cause more energy usage by hardware components than others, either due to the nature of the work they perform, or due to bugs and other implementation defects. Additionally, over the lifetime of a device, users tend to install more and more applications without uninstalling unused applications. As a result, mobile computing devices can build up a collection of unused or rarely used applications that cause energy resources to be consumed by hardware components as a result of executing background activity.

As a result of the foregoing, mobile computing device often achieve unacceptably short and/or inconsistent device runtimes when operating on battery power.

BRIEF SUMMARY

Embodiments described herein are directed to achieving consistent battery drain rates at mobile computing devices, and longer battery life overall, using time-based energy allotments and priorities assigned to running applications. In particular, embodiments described herein utilize a priority-based system and per-application energy budgets to ensure that applications contributing most to a user-facing experience are allowed to use energy allotted for a particular time period, while reducing or eliminating the amount of energy used by applications that contribute less or not at all to the user-facing experience.

In some embodiments, achieving a consistent battery drain rate at a mobile computing device includes identifying an amount of available energy based on a battery capacity, and identifying a target mobile computing device runtime while using the available energy. A plurality of time periods over which to budget energy use to achieve the target device runtime while using the available energy are determined. Based on the amount of available energy, and based on the target mobile computing device runtime, an allotment of the available energy for each of the plurality of time periods is determined.

Achieving a consistent battery drain rate also includes determining how to allocate the allotted energy for a current time period of the plurality of time periods among a plurality of applications executing during the current time period, which includes identifying a priority of each application based at least on one or more user-facing attributes of the application, identifying an energy budget of each application, and allotting a portion of the allotted energy for the current time period to each application based at least on the identified priority of each application and on the energy budget of each application. An energy budget for at least one of the plurality of applications is adjusted based on that applications' energy usage during the current time period.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
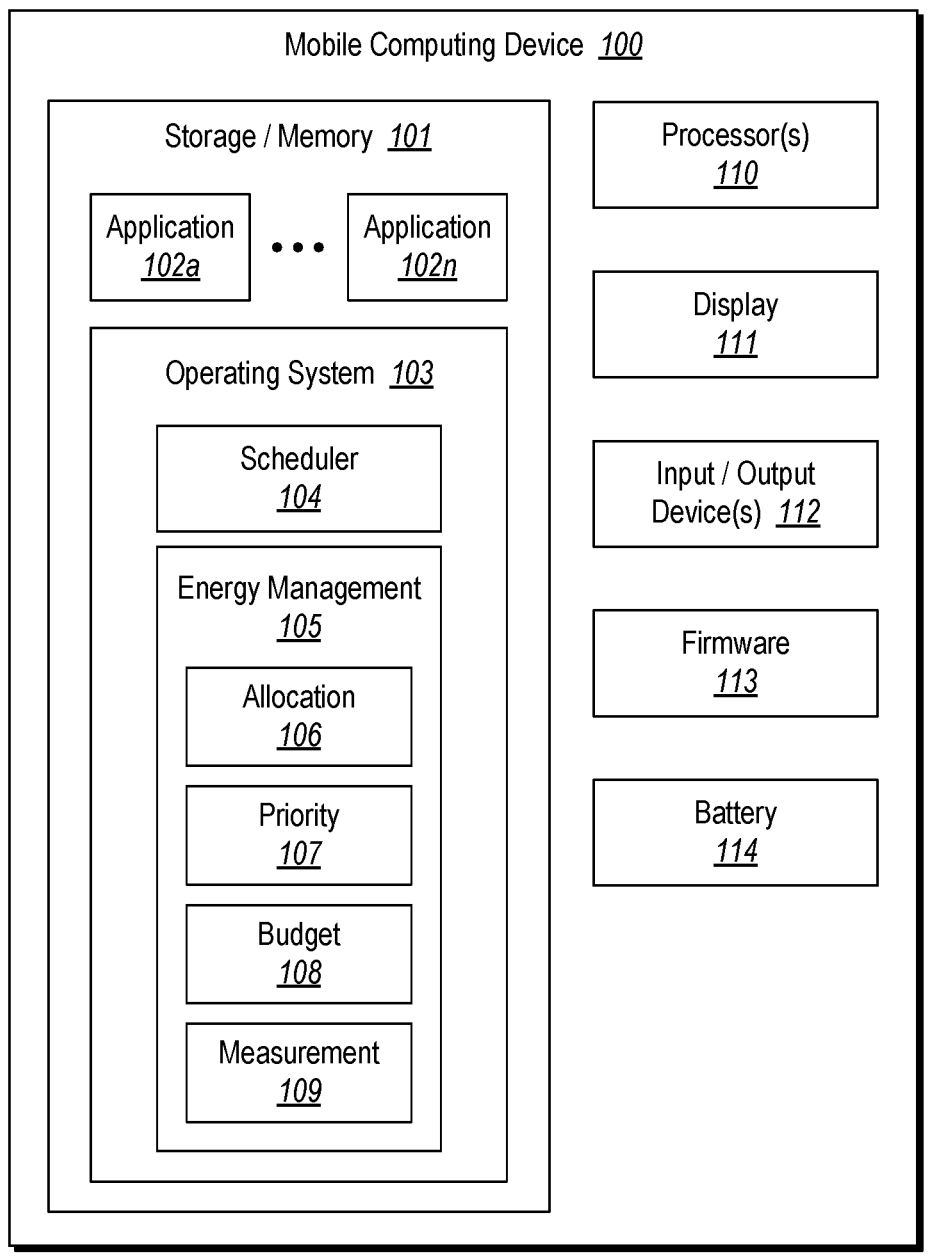
FIG. 1 illustrates an example mobile computing device that schedules applications based on energy budgets.

Embodiments described herein are directed to achieving consistent battery drain rates at mobile computing devices, and longer battery life overall, using time-based energy allotments and priorities assigned to running applications. In particular, embodiments described herein utilize a priority-based system and per-application energy budgets to ensure that applications contributing most to a user-facing experience are allowed to use energy allotted for a particular time period, while reducing or eliminating the amount of energy used by applications that contribute less or not at all to the user-facing experience.

In general, embodiments described herein introduce a method by which an operating system assigns a rank or score to applications based on the perceived relative "importance" of each application compared to other applications on the computer system. Based on the resulting relative scores, the operating system can then ration the computer system's available energy among the applications, such that applications that are more important to the user can be permitted to run and consume a larger share of the computer system's battery, while relatively unimportant applications might be permitted to use little or even none of the battery. This allows the operating system to provide a consistent and predictable battery drain rate, and to prevent battery life from degrading over time as more applications are installed, while ensuring the applications that a user spends the most time interacting with continue to deliver the expected experiences.

Embodiments introduce the concept of a User Importance Score (UIS), which is assigned to applications, and by which the applications are ranked and assigned varying energy budgets (defining how much energy each application is permitted to use during a given period of time, as discussed later). The UIS for an application is derived from a variety of signals, including signals that capture factors such as how much the application contributes to the user experience relative to other applications installed on the system, how much the user uses the application, how user-visible an application tends to be, etc.

Example inputs to a UIS could include how recently a user has launched an application, how frequently a user launches an application, how much time the user spends interacting with the application, or whether and how often the application raises user-visible notifications when the user is not actively interacting with the application (such as visible banners, alerts, or "toast" notifications; audible alerts; or updating badges, tiles or similar notification areas). The UIS may also take into account factors such as the type or category (e.g., from an application store) of the application. For example, the UIS may give preference to communications or social media applications, as such applications tend to require more real-time responsiveness than other types of applications to meet user expectations. The UIS may also include factors about the quality of applications. An application's UIS could be lowered, for example, if the application has a history of crashing, hanging or otherwise misbehaving or violating system or application store policies.

In some embodiments, these various inputs are collected and weighted to form a score for each application, which ranks applications such that applications that are more user visible (because the user directly uses them more and/or because they raise user-visible events) have higher rank than less user-visible applications. Thus, when allocating limited energy resources to applications, the operating system can dedicate greater energy resources to applications that would contribute more to the user-visible experience, while restricting energy consumption caused by less user-visible applications.

Some embodiments define a threshold that is used in connection with the UIS. In these embodiments, applications that are ranked below the threshold are considered "unimportant" to the user, since they are not regularly used and are not very visible to the user, are thus unlikely to be missed. These applications could be prevented from running entirely, prevented from running when the battery is low, or even uninstalled (possibly after prompting the user first).

As mentioned previously, embodiments also introduce the concept of an application-based energy budget. In these embodiments, each application is allocated an energy budget based on its assigned UIS and available energy, such that applications with higher scores are assigned larger energy budgets. The energy budget is determined based on defining a minimum amount of time the device's battery is desired to last (which could be configured per Stock Keeping Unit (SKU) or device). This minimum desired runtime, when combined with the capacity of the device's battery, can be used to calculate the amount of energy that is available to be used by all applications in total. This amount can then be divided into a plurality of time periods (which could be fixed-length or variable-length), such that each time period has an allotment of the total energy. During each of those time periods applications are assigned a fraction of the time period's allotment, based on the total number of applications executing and/or anticipated to execute during the time period and their relative importance scores.

To the accomplishment of the foregoing and other embodiments, FIG. 1 illustrates an example mobile computing device 100 that schedules applications based on energy budgets. As illustrated, the mobile computing device 100 includes various energy-consuming hardware components, such as processor(s) 110 (e.g., application processors and Graphical Processing Units (GPUs)), a display 111, and input/output device(s) 112 (e.g. wireless radios, audio devices, microphones, touch digitizers, etc.). The mobile computing device 100 also includes firmware 113, such as firmware storing computer-executable instructions for managing lower-level operation of the hardware components of the mobile computing device 100 including, for example, power management attributes and settings for the hardware components. The mobile computing device 113 also includes a battery 113, representing any available energy storage device.

As illustrated, the mobile computing device 100 includes storage/memory 101, which represents one or both of system memory (e.g., RAM) and durable storage (e.g., flash storage devices, hard disks, etc.). The storage/memory 101 includes software components, such as applications 102 (illustrated as applications 102a-applications 102n) and an operating system 103. It will be appreciated that these software components can exist within durable storage and/or system memory. For example, executable instructions for an application or operating system components may be stored on durable storage, and may be loaded into system memory when the application/operating system components are being executed by the processor(s) 110.

FIG. 1 illustrates that the mobile computing device 100 includes as part of the operating system 103 a scheduler 104 and an energy management component 105. Although the scheduler 104 and energy management component 105 are illustrated as being part of the operating system 103, it will be appreciated that all or a portion of these components may exist separate from the operating system 103 within the storage/memory 101 and/or within the firmware 113. For example, portions of the energy management component 105, such as those relating to measuring power use and/or managing energy use by the hardware components, may exist with the firmware 113. Additionally, although depicted as being separate components for ease of description, it will be appreciated that the scheduler 104 and energy management component 105 could be combined into single component or set of related components.

In general, the scheduler 104 manages the scheduling of execution of applications/processes at the processor(s) 110. In accordance with the embodiments herein, the scheduler 104 operates in connection with the energy management component 105, such that the scheduler 104 schedules applications and operating system components for execution based at least in part on a UIS of each application and an energy budget of each application. Accordingly, FIG. 1 illustrates that the energy management component 105 can include one or more functions, illustrated herein as sub-components, for managing energy allocation and use. As illustrated, for example, the energy management component 105 could include an allocation component 106, a priority component 107, a budget component 108, and a measurement component 109, though this particular arrangement is but one example given for ease of description.

The allocation component 106 represents functionality of the energy management component 105 for allotting available energy to time periods. As indicated previously, embodiments herein include computation of a desired device runtime when on battery power, a plurality of time periods over which the assign energy budgets during that runtime, and an energy budget for each time period. Thus, for example, the allocation component 106 may be configured to determine one or more of a type of the mobile computing device 100 (e.g., based on a device SKU, model identifier, etc.) and an amount of available energy (i.e., the capacity of the battery 114) as part of identifying the desired device runtime, the plurality of time periods, and the time period energy allotments. In some embodiments, the allocation component 106 computes the foregoing when external power is removed from the mobile computing device 100, though the foregoing could be dynamically recomputed on a periodic basis while the mobile computing device 100 operates on battery power.

The allocation component 106 may determine the device type and/or battery capacity based on interfacing with the firmware 113, or consulting data stored within the operating system 103. In some embodiments, the battery capacity is determined based on the device type and/or a battery identifier, and based on consulting a database correlating device types with battery types and/or battery types with battery capacities. In other embodiments the battery capacity is determined based on a query to the firmware 113 that reports actual current battery capacity as measured by the firmware 113. In these embodiments, the energy budgets are dynamically adjustable as the capacity of the battery 114 degrades over time (i.e., due to repeated charge/discharge cycles), and/or when the battery 114 is only partially charged when external power is removed from the mobile computing device 100.

The allocation component 106 may determine the desired device runtime based on the device type (e.g., by consulting a database correlating different device types to desired runtimes) and/or the available battery capacity. For example, a desired device runtime may be reduced when the available battery capacity is less than nominal, such as due to the battery being partially charged or having a degraded total available capacity due to age.

Once the allocation component 106 identifies a desired device runtime and an amount of available energy, the allocation component 106 can divide the desired device runtime into a plurality of time periods, and compute an allotment of the available energy for each time period. For example, if the desired device runtime is 12 hours that is divided into forty-eight 15-minute periods, and the available energy is 1,900 mAh, then each time period could be allotted about 39.6 mAh.

In some embodiments, the allocation component 106 only allots energy for foreground and accounted-for activity. In particular, on any system, energy monitoring is imperfect, and there is some amount of energy that cannot be attributed to be caused by a particular application. This energy is consumed by system services performing tasks on behalf of applications, or the operating system itself. This energy can also include power used by shared resources such as the device's screen, radios, and other hardware components. In some embodiments, this unaccounted-for energy is left out of the calculations, or is distributed and charged to applications as a "system tax." As an example, the allocation component 106 may determine that 10% of energy use unaccounted for or is for core background operating system functions. As such, the allocation component 106 may reduce the energy allotments by 10%.

The priority component 107 represents functionality of the energy management component 105 for prioritizing applications, such as based on UIS. As mentioned previously, applications can be ranked/prioritized based on their relative importance or visibility to the user, which may be captured as a User Importance Score. Assigning a UIS may include assigning a binary value to the application (e.g., the application is important or the application is not important based on the presence or absence of one or more signals), or may include assigning a distribution of values. For example, each signal that is present, or value associated with the signal, may be weighted and added together to form the UIS.

There are various signals/factors that the priority component 107 can use to form a UIS for an application. As indicated previously, some of these signals/factors could include how recently the application was launched, how frequently the application is launched, how much time the user spends interacting with the application, user-visible notifications raised by the application, application category, application quality/behavior, etc. Some other signals/factors could include whether the application is pinned (e.g., to a start menu, task bar, dock, or other launcher), whether the application is on the default home screen, how long the application spends in the foreground, whether the user interacts with notifications from the application, whether the application appears on a lock screen, or any other indicator that the application is frequently used by and/or highly visible to a user. In some embodiments, signals include express user input specifying application importance. For example, the mobile computing device 100 may provide a user interface for a user to categorize and/or rank applications by their importance, may prompt a user to indicate whether or not an application is important (e.g., upon installation of the application, or upon execution of the application), may enable an application developer to specify a visibility metric for an application, etc.

In some embodiments, an application may be considered user-visible, even if the application has not been used, based on its category. For example, if a determination is made that the category of e-mail communications is important to the user (e.g., because the user frequently uses an e-mail application), then other applications within that same category (i.e., e-mail) may have an increased UIS. Determining the category of an application may be based on an application store category, Application Programming Interfaces (APIs) used by the application, system triggers used by the application, other runtime behaviors of the application, etc.

The budget component 108 represents functionality of the energy management component 105 for allocating a time period's allotment of energy among applications based on the priority and energy budget of each application. In particular, for each given time period, the budget component 108 can allocate that time period's allotment of energy among a plurality of applications. The applications that receive an allocation of the time period's allotted energy may be applications that are currently executing at the start of the time period, applications for which there is a UIS or a UIS above a defined threshold, applications that are anticipated to execute during the time period, etc.

In allocating a time period's allotment of energy among a plurality of applications, the budget component 108 forms an energy budget for each application. For example, the budget component 108 may determine how many total milliwatts (mW) are available for the time period, determine a plurality of applications for which energy is to be allotted during the time period, and proportionally allocate a portion of the total mW to each application based on its priority/UIS. Consider a simple example in which there are three applications (application A, B, and C) that are to execute during a time period, and in which application A has a UIS of 1, application B has a UIS of 2, and application C has a UIS of 3. If there are 100 mW available during the time period, the budgets of each application could be:

Application A: $100*(1/6)=16.7$ mW

Application B: $100*(2/6)=33.3$ mW

Application C: $100*(3/6)=50$ mW

It will be appreciated in view of the disclosure herein that there are a vast variety of manners for budgeting energy among applications based on total energy available and application priorities or scores.

The scheduler 104 then schedules applications to execute during the time period, based on their energy budgets. Thus, for example, Application C above would be permitted by the scheduler to execute long enough during the time period to cause 50 mW of energy consumption, while Application A would only be permitted execute long enough during the time period to cause 16.7 mW of energy consumption. It will be appreciated that an application need not consume its entire energy budget—for example, if Application A requested only enough work during the time period to consume 5 mW, then that is all that Application A would consume.

As applications execute, the measurement component 109 monitors the amount of energy consumed by their execution. This information can be derived from a variety of sources including energy usage information made available by the hardware platform itself (e.g., from the firmware 113), as well as estimation that can be determined based on the amount of CPU cycles, disk I/O, network traffic, and graphics usage done by the application. The amount of energy applications use is then deducted from its budget.

When an application's energy budget is exhausted, the scheduler 104 may choose to take action to restrict further execution of the application. For example, opportunistic background activity the application wishes to perform may be delayed or even cancelled. Other examples of action the operating system may choose to take include raising a notification to inform a user of excessive energy usage by a particular application, or forcibly terminating the application.

It will also be appreciated that there may be some exceptional cases in which an application is permitted to cause more energy consumption than its budget. For example, if an application is visible to a user and/or actively being used by the user, that application may also be permitted to exceed its energy budget. In another example, the operating system 103 may identify "critical" activity that must be performed to meet user expectations, even if energy budgets are exhausted. In these cases, (such as delivering an SMS text message, or handling an incoming phone or VOIP call), the activity must be performed to meet the user's expectations, even if that means draining more power than the energy management component 105 wishes to use during a given time period. For example, the operating system 103 may maintain a list of conditions or activity types that are "critical."

The scheduler 104 may permit critical activity by an application, or operation of an actively used application, even if that application's energy budget is drained. In this case, the application will still be "charged" for the energy consumed by these activities, possibly causing its budget to go negative—a state referred to as "energy debt." An application in a state of energy debt may have its non-critical activity postponed by the scheduler 101 until enough time has elapsed for it to rebuild its energy budget. This causes the system to still perform critical functions, while getting more and more restrictive of non-critical functions as the battery drains too quickly.

Accordingly, at the end of a time period the budget component 108 may have assigned a positive or a negative energy budget to an application. By extension, an application may have a positive or a negative energy budget at the entry of a new time period. In such situations, the budget component 108 may carry over the surplus or debt for that application to the next time period (e.g., an application may have additional energy available during a time period if it didn't use its full budget(s) during prior time period(s), or may have less energy available during a time period if it exceeded it budget(s) during prior time period(s)). Additionally or alternatively, the budget component 108 may reallocate any budget surpluses or debts among applications (e.g., it may use one application's surplus to compensate for another application's debt, it may add one application's surplus to the budget of another application that has an increasing UIS, etc.). Additionally or alternatively, the budget component 108 may use budget surpluses or debts to recalculate the allotment of energy available to one or more future time periods (e.g., to reduce the total energy available in each time period if there is an overall energy debt in order to extend runtime, or to increase total energy available in each time period if there is an overall energy surplus in order to increase performance).

In some embodiments, the energy management component 105 accounts for other device state when determining the allocation of energy to time periods. For example, the energy management component 105 may observe that the mobile computing device 100 is in a lower energy use state (e.g., because its screen is off, its radios are off, etc.) and adjust one or more time periods to have a lower allotment of energy during this lower energy use state. Conversely, the energy management component 105 may observe that the mobile computing device 100 is in a higher energy use state (e.g., because its screen is on, its radios are active, etc.), and adjust one or more time periods to have a lower allotment of energy during this higher energy use state.

Figure 2A:
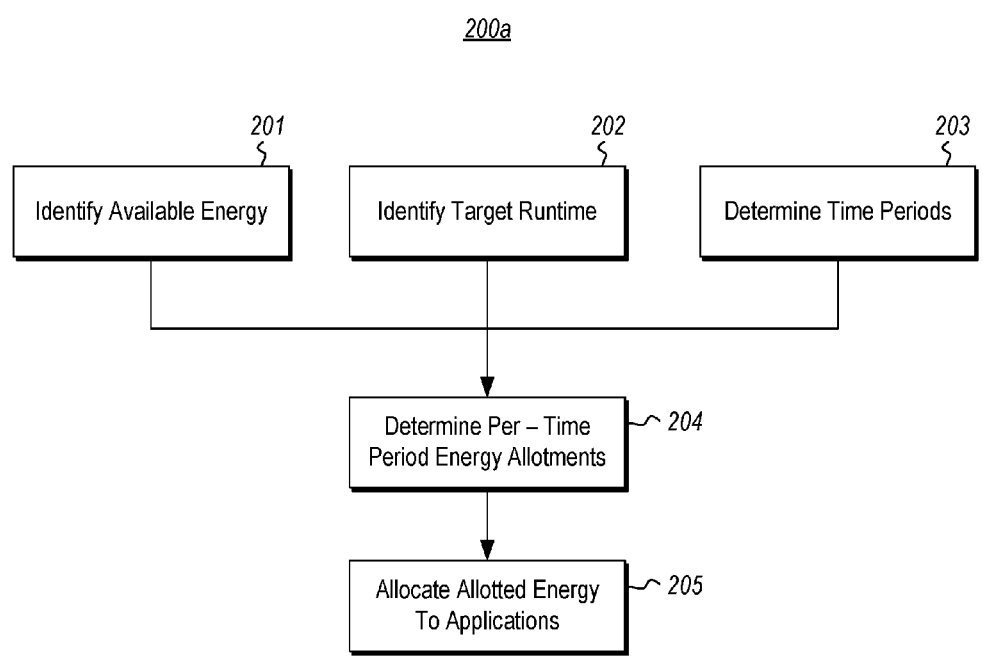
FIG. 2A illustrates a flow chart of an example method for achieving a consistent battery drain rate at a mobile computing device.
Figure 2B:
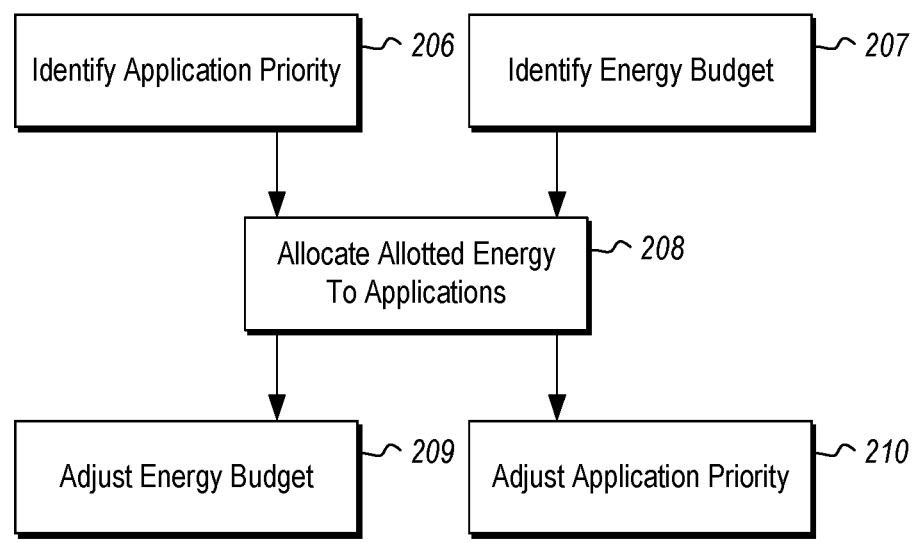
FIG. 2B illustrates a flow chart of an example method for allocating allotted energy to applications.

In view of the foregoing, FIGS. 2A and 2B illustrate flow charts of an example method 200 for achieving a consistent battery drain rate at a mobile computing device. These flow charts are described with reference to the mobile computing device 100 of FIG. 1.

FIG. 2A illustrates a method 200a for achieving a consistent battery drain rate at a mobile computing device. FIG. 2A illustrates that the method 200a can include an act 201 of identifying available energy, an act 202 of identifying a target runtime, and an act 203 of determining time periods. For example, act 201 can comprise identifying an amount of available energy based on a battery capacity, act 202 can comprise identifying a target mobile computing device runtime while using the available energy, and act 203 can comprise determining a plurality of time periods over which to budget energy use to achieve the target device runtime while using the available energy.

For example, the allocation component 106 can identify a type of the mobile computing device 100 being used and/or a type or capacity of an available battery 114, and derive the available energy and/or the target runtime from this information. In some embodiments, this may include a query to firmware 113 of the mobile computing device 100 and/or consulting one or more databases. Additionally, the allocation component 106 can determine a number and/or length of time periods to which the total energy availability will be allotted. As depicted, each of these acts can occur independent from one another, although it may be that there are dependencies. For example, it may be that identifying the target mobile computing device runtime is dependent on first identifying the amount of available energy. As another example, it may be the determining the time periods is dependent on first identifying the target mobile computing device runtime.

FIG. 2A also illustrates that the method 200a can include an act 204 of determining per-time period energy allotments. Act 204 can comprise, based on the amount of available energy and the target mobile computing device runtime, determining an allotment of the available energy for each of the plurality of time periods. For example, based on the total available energy, and based on the total energy availability, the allocation component 106 can determine an allotment of the total energy to each time period. This may include allotting only a portion of the available energy, to account for energy consumed by system services performing tasks on behalf of applications, the operating system itself, or energy used by shared resources such as the device's screen, radios, and other shared hardware components.

FIG. 2A also illustrates that the method 200a can include an act 205 of allocating allotted energy to applications. Act 205 can comprise, determining how to allocate the allotted energy for a current time period of the plurality of time periods among a plurality of applications executing during the current time period. For example, the budget component 108 can allocate a current time period's allotment of energy among applications based on the priority (as computed by the priority component 108) and energy budget of each application.

FIG. 2B illustrates a method 200b for allocating allotted energy to applications. For example, FIG. 2B may represent the acts that are performed as part of the act 205 of allocating allotted energy to applications.

FIG. 2B illustrates that the method 200b can include an act 206 of identifying application priority. Act 206 can comprise identifying a priority of each application, each application's priority based at least on one or more user-facing attributes of the application. For example, the priority component 107 can compute a priority of applications based on their user visibility. In doing so, the priority component 107 may compute a UIS based on various signals, such as how recently the application was used, notification behavior of the application, whether the application is in the foreground, etc.

FIG. 2B also illustrates that the method 200b can include an act 207 of identifying energy budget. Act 207 can comprise identifying an energy budget of each application. For example, the budget component 109 can compute a budget for each application for a time period, based on that application's priority and based on the amount of energy allotted to the time period. In some embodiments, an application may enter a time period with an energy surplus or deficit (debt) based on prior activity by the application. The budget component 109 can account for these surpluses/deficits by accounting for them with the application having the surplus/deficit, by balancing surpluses/deficits among applications, or by adjusting the energy allotments for one or more time periods.

FIG. 2B also illustrates that the method 200b can include an act 208 of allocating allotted energy to applications. Act 208 can comprise, based at least on the identified priority of each application, and based at least on the energy budget of each application, allocating a portion of the allotted energy for the current time period to each application. For example, the energy management component 105 can work with the scheduler 104 to ensure that the energy consumed by execution of each application within the time period does not exceed the application's energy budget, absent exceptional circumstances such as critical activity. As such, act 208 could include scheduling each of the plurality of applications to execute during the time period, based each application's allocated portion of the allotted energy for the current time period. The scheduling can include restricting activity of an application based on its allocated portion of the allotted energy having been exhausted, or allowing an application to exceed its allocated portion of the allotted energy based on critical activity associated with the application.

FIG. 2B also illustrates that the method 200b can include an act 209 of adjusting energy budget. Act 209 can comprise adjusting the energy budget for at least one of the plurality of applications based on that applications' energy usage during the current time period. For example, throughout the time period, or at the end of the time period, the budget component 108 can re-compute each application's budget based on the energy it consumed while executing during the time period (e.g., as measured by the measurement component 109). Because an application may have consumed more energy than allotted (e.g., due to being actively used by a user or due to critical activity), or may have consumed less energy than allotted, act 209 could include assigning an energy budget surplus or an energy budget deficit to an application based on that applications' energy usage during the current time period.

FIG. 2B also illustrates that the method 200b can include an act 210 of adjusting application priority. Act 210 can comprise adjusting the priority of at least one of the plurality of applications based on updated signals associated with the application. For example, throughout the time period, or at the end of the time period, the priority component 107 can re-compute at least one application's priority based on one or more changed signals. For example, it may be that an application is given a higher UIS based on frequent use by the user during the time period, based on a number of notifications issued by the application during the time period, etc.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a mobile computing device comprising one or more processors, of achieving a consistent battery drain rate at a mobile computing device, the method comprising:
    identifying an amount of available energy for the mobile computing device based on a battery capacity of the mobile computing device;
    identifying a target runtime for the mobile computing device based on the amount of available energy;

determining a plurality of time periods over which to budget energy use to achieve the target runtime for the mobile computing device while using the amount of available energy;

based on the amount of available energy and the target runtime of the mobile computing device, determining an allotment of the amount of available energy for each of the plurality of time periods;

determining how to allocate the allotted energy for a current time period of the plurality of time periods among a plurality of applications executing on the mobile computing device during the current time-period, including:

identifying a priority of each application, each application priority based at least on one or more user-facing attributes of the application;

identifying an energy budget of each application; and based at least on the identified priority of each application, and based at least on the energy budget of each application, allocating a portion of the allotted energy for the current time-period to each application; and adjusting the energy budget for at least one of the plurality of applications based on the energy usage of the at least one of the plurality of applications during the current time period.

2. The method of claim 1, wherein adjusting the energy budget for at least one of the plurality of applications comprises assigning an energy surplus or an energy debt to an application based on energy use by the application during the current time period.

3. The method of claim 1, further comprising adjusting the allotted energy for at least one time period based on the mobile computing device being in a lower energy use state or a higher energy use state.

4. The method of claim 1, further comprising adjusting the allotted energy for at least one future time period based on an energy budget surplus or an energy budget deficit from the current time period.

5. The method of claim 1, wherein adjusting the energy budget for at least one of the plurality of applications based on that applications' energy usage during the current time period comprises assigning an energy budget surplus or an energy budget deficit to that application based on that applications' energy usage during the current time period.

6. The method of claim 1, further comprising adjusting an energy budget for a first application based on an energy budget surplus or an energy budget deficit of a second application.

7. The method of claim 1, further comprising scheduling each of the plurality of applications to execute during the time period, based on each application's allocated portion of the allotted energy for the current time period.

8. The method of claim 7, wherein scheduling an application to execute comprises restricting activity of the application based on its allocated portion of the allotted energy having been exhausted.

9. The method of claim 7, wherein scheduling an application to execute comprises exceeding its allocated portion of the allotted energy based on critical activity associated with the application.

10. A computer system, comprising:
one or more processors;
a battery; and
one or more computer-readable media having stored thereon computer-executable instructions that are executable by the one or more processors to cause the computer system to achieve a consistent drain rate of the battery, the computer-executable instructions including instructions that are executable to cause the computer system to perform at least the following:

identify an amount of available energy for the computer system based on a battery capacity of the battery;

identify a target runtime for the computer system while using the amount of available energy;

determine a plurality of time periods over which to budget energy use to achieve the target runtime for the computer system while using the amount of available energy;

based on the amount of available energy and the target runtime of the computer system, determine an allotment of the amount of available energy for each of the plurality of time periods;

determine how to allocate the allotted energy for a current time period of the plurality of time periods among a plurality of applications executing on the computer system during the current time period, including:

identifying a priority of each application, each application priority based at least on one or more user-facing attributes of the application;

identifying an energy budget of each application; and based at least on the identified priority of each application, and based at least on the energy budget of each application, allocating a portion of the allotted energy for the current time period to each application; and adjust the energy budget for at least one of the plurality of applications based on the energy usage of the at least one of the plurality of applications during the current time period.

11. The computer system of claim 10, wherein adjusting the energy budget for at least one of the plurality of applications comprises assigning an energy surplus or an energy debt to an application based on energy use by the application during the current time period.

12. The computer system of claim 10, the computer-executable instructions also including instructions that are executable to cause the computer system to adjust the allotted energy for at least one time period based on the computer system being in a lower energy use state or a higher energy use state.

13. The computer system of claim 10, the computer-executable instructions also including instructions that are executable to cause the computer system to adjust the allotted energy for at least one future time period based on an energy budget surplus or an energy budget deficit from the current time period.

14. The computer system of claim 10, wherein adjusting the energy budget for at least one of the plurality of applications based on that applications' energy usage during the current time period comprises assigning an energy budget surplus or an energy budget deficit to that application based on that applications' energy usage during the current time period.

15. The computer system of claim 10, the computer-executable instructions also including instructions that are executable to cause the computer system to adjust an energy budget for a first application based on an energy budget surplus or an energy budget deficit of a second application.

16. The computer system of claim 10, the computer-executable instructions also including instructions that are executable to cause the computer system to schedule each of the plurality of applications to execute during the time period, based on each application's allocated portion of the allotted energy for the current time period.

17. The computer system of claim 16, wherein scheduling an application to execute comprises restricting activity of the application based on its allocated portion of the allotted energy having been exhausted.

18. The computer system of claim 16, wherein scheduling an application to execute comprises exceeding its allocated portion of the allotted energy based on critical activity associated with the application.

19. A computer program product comprising one or more hardware storage devices having stored thereon computer-executable instructions that are executable by one or more processors of a computer system to cause the computer system to achieve a consistent battery drain rate, the computer-executable instructions including instructions that are executable to cause the computer system to perform at least the following:
    identify an amount of available energy for the computer system based on a battery capacity of the computer system;
    identify a target runtime for the computer system while using the amount of available energy;
    determine a plurality of time periods over which to budget energy use to achieve the target runtime for the computer system while using the amount of available energy;
    based on the amount of available energy and the target runtime for the computer system, determine an allotment of the amount of available energy for each of the plurality of time periods;
    determine how to allocate the allotted energy for a current time period of the plurality of time periods among a plurality of applications executing on the computer system during the current time period, including:
        identifying a priority of each application, each application priority based at least on one or more user-facing attributes of the application;
        identifying an energy budget of each application; and
        based at least on the identified priority of each application, and based at least on the energy budget of each application, allocating a portion of the allotted energy for the current time period to each application; and
    adjust the energy budget for at least one of the plurality of applications based on the energy usage of the at least one of the plurality of applications during the current time period.

20. the computer program product of claim 19, wherein adjusting the energy budget for at least one of the plurality of applications comprises assigning an energy surplus or an energy debt to an application based on energy use by the application during the current time period.

* * * * *